United States Patent
Lee et al.

(10) Patent No.: US 10,514,538 B2
(45) Date of Patent: Dec. 24, 2019

(54) HEAD-MOUNTED DISPLAY DEVICE

(71) Applicant: LG INNOTEK CO., LTD., Seoul (KR)

(72) Inventors: Sang Hun Lee, Seoul (KR); Tae Kyung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/569,025

(22) PCT Filed: Apr. 21, 2016

(86) PCT No.: PCT/KR2016/004136
§ 371 (c)(1),
(2) Date: Oct. 24, 2017

(87) PCT Pub. No.: WO2016/171479
PCT Pub. Date: Oct. 27, 2016

(65) Prior Publication Data
US 2018/0129045 A1 May 10, 2018

(30) Foreign Application Priority Data
Apr. 24, 2015 (KR) .................. 10-2015-0057875

(51) Int. Cl.
*G02B 27/00* (2006.01)
*G02B 27/01* (2006.01)
(Continued)

(52) U.S. Cl.
CPC ........... *G02B 27/0101* (2013.01); *G02B 5/04* (2013.01); *G02B 19/0047* (2013.01);
(Continued)

(58) Field of Classification Search
CPC ...... G02B 5/04; G02B 5/045; G02B 19/0047; G02B 26/0816; G02B 27/01;
(Continued)

(56) References Cited

U.S. PATENT DOCUMENTS 4,302,079 A * 11/1981 White .................. G02B 17/008
359/352
5,886,822 A * 3/1999 Spitzer ............... G02B 27/0172
359/630
(Continued)

FOREIGN PATENT DOCUMENTS

KR 10-2006-0119711 A 11/2006
KR 10-2014-0036351 A 3/2014
(Continued)

OTHER PUBLICATIONS

International Search Report in International Application No. PCT/KR2016/004136, filed Apr. 21, 2016.

*Primary Examiner* — Cara E Rakowski
*Assistant Examiner* — Magda Cruz
(74) *Attorney, Agent, or Firm* — Saliwanchik, Lloyd & Eisenchenk

(57) ABSTRACT

Disclosed is a head mounted display device, the head mounted display device according to an exemplary embodiment of the present invention may comprise: a prism for changing a path of incident light and then emitting the incident light, the prism having therein a reflection-transmission surface for reflecting or transmitting the incident light; and a camera module of which a lens is disposed in a direction that faces the prism.

20 Claims, 4 Drawing Sheets

(51) Int. Cl.
*G02B 5/04* (2006.01)
*G02B 19/00* (2006.01)
*G02B 26/08* (2006.01)
*G02B 27/28* (2006.01)

(52) U.S. Cl.
CPC ..... *G02B 26/0816* (2013.01); *G02B 27/0172* (2013.01); *G02B 27/283* (2013.01); *G02B 2027/0138* (2013.01); *G02B 2027/0178* (2013.01)

(58) Field of Classification Search
CPC ............ G02B 27/0101; G02B 27/0172; G02B 2027/0178; G02B 27/10; G02B 27/28; G02B 27/283
See application file for complete search history.

(56) References Cited

U.S. PATENT DOCUMENTS

| | | | | |
|---|---|---|---|---|
| 6,331,916 | B1* | 12/2001 | Mukawa | G02B 27/0172 359/630 |
| 2007/0064210 | A1* | 3/2007 | Kobayashi | G03B 27/52 355/53 |
| 2012/0127715 | A1* | 5/2012 | Ariga | G02B 27/108 362/235 |
| 2013/0021658 | A1* | 1/2013 | Miao | G02B 27/283 359/256 |
| 2013/0250415 | A1 | 9/2013 | Gupta | |

FOREIGN PATENT DOCUMENTS

| | | |
|---|---|---|
| KR | 10-2014-0097748 A | 8/2014 |
| KR | 10-2015-0024580 A | 3/2015 |

* cited by examiner

HEAD-MOUNTED DISPLAY DEVICE

CROSS-REFERENCE TO RELATED APPLICATIONS

This application is the U.S. national stage application of International Patent Application No. PCT/KR2016/004136, filed Apr. 21, 2016, which claims priority to Korean Application No. 10-2015-0057875, filed Apr. 24, 2015, the disclosures of each of which are incorporated herein by reference in their entirety.

TECHNICAL FIELD

The teachings in accordance with exemplary and non-limiting embodiments of this invention relate generally to a head mounted display device.

BACKGROUND ART

An HMD (Head Mount Display) is a type of virtual image optical systems. An optical system is an image display device to allow a user to see an enlarged virtual image by forming a focus so that an image light generated from a position very near to an eye can be configured on a virtual large-sized screen at a remote distance using an accurate optical device. Although an optical system for HMD was originally developed for military purpose, the optical system for HMD is currently used in various fields including aerospace, video games, practical training and leisure fields as the high performance and miniaturization of computer systems are drastically advanced and rapid development of display devices provide a wearable computer concept wearable on a body.

Inter alia, a head mounted display device is used with a method in which an image of a display device can be viewed by a user and the head mounted display device is also mounted with a camera to photograph a sight viewed by a user so that the photographed sight is provided to a user. At this time, however, the camera cannot be mounted at a place in front of an eye of a user such that the camera is inevitably mounted at a lateral surface of an eye. Thus, when the camera is mounted to face a front side, there may be generated with a problem where a vision field viewed by a user of the head mounted display device and a photographed scope photographed by a camera cannot be matched.

DETAILED DESCRIPTION OF THE INVENTION

Technical Subject

In order to solve the abovementioned problems/disadvantages, an exemplary embodiment of the present invention provides a head mounted display device in which a vision field of a camera mounted on the device is same as (matches to) a vision field of a user wearing the device.

Technical Solution

In one general aspect of the present invention, there is provided a head mounted display device, the device comprising:

a prism for changing a path of incident light and then emitting the incident light, the prism having therein a reflection-transmission surface for reflecting or transmitting the incident light; and a camera module of which a lens is disposed in a direction that faces the prism.

Preferably, but not necessarily, the prism may include a first optical surface, a second optical surface extensively formed from the first optical surface, a third optical surface extensively formed from the second optical surface and formed in parallel with the first optical surface, and a fourth optical surface extensively formed from the third optical surface and facing the second optical surface, wherein the prism may further comprise a first reflection-transmission surface slantly formed between the first optical surface and the third optical surface.

Preferably, but not necessarily, the first reflection-transmission surface may be a first polarization beam splitter that reflects or projects a light in response to a polarization component.

Preferably, but not necessarily, the first polarization beam splitter may be slantly formed at a 45° between the first optical surface and the third optical surface.

Preferably, but not necessarily, the second optical surface may be formed with a condenser lens.

Preferably, but not necessarily, the first polarization beam splitter may emit the incident light to the camera module by reflecting the incident light.

Preferably, but not necessarily, the prism may further include, at one side, a display device displaying an image photographed by the camera module.

Preferably, but not necessarily, the prism may further include a second reflection-transmission surface formed in parallel with the first reflection-transmission surface.

Preferably, but not necessarily, the first reflection-transmission surface may be a second polarization beam splitter.

Preferably, but not necessarily, the display device may be formed at one side of the third optical surface, and the third optical surface may be formed with a condenser lens.

Preferably, but not necessarily, the second polarization beam splitter may reflect a polarization component emitted from the display device.

Preferably, but not necessarily, the fourth optical surface may reflect a light reflected from the second polarization beam splitter.

Preferably, but not necessarily, the fourth optical surface may be concavely formed.

Preferably, but not necessarily, the fourth optical surface may be coated with a reflective coating.

Advantageous Effects of the Invention

According to the present invention, a vision field of a camera mounted on a head mounted display device can be advantageously same as a vision field of a user wearing the device.

BEST MODE

In the following detailed description, numerous specific details are set forth in order to provide a thorough understanding of the present invention. However, this invention may be embodied in many different forms and should not be construed as limited to any specific structure or function presented throughout this invention. Thus, the invention described herein is intended to embrace all such alternatives, modifications, variations and applications as may fall within the spirit and scope of the appended claims.

Now, a head mounted display device according to an exemplary embodiment of the present invention will be described in detail with reference to the accompanying drawings.

Figure 1:
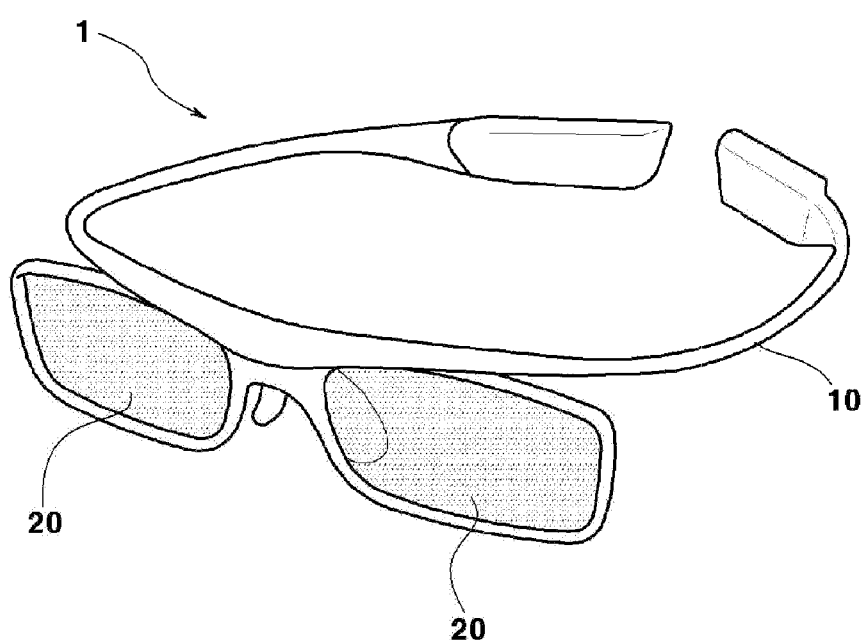
FIG. 1 is a perspective view illustrating an external shape of a head mounted display device according to an exemplary embodiment of the present invention.

FIG. 1 is a perspective view illustrating an external shape of a head mounted display device according to an exemplary embodiment of the present invention.

Referring to FIG. 1, a head mounted display device (1) according to an exemplary embodiment of the present invention has a type of device mounted on a head of a user. The head mounted display device according to an exemplary embodiment of the present invention may have a shape similar to a conventional glasses, and may include a frame (10) provided to be mounted on a head or an ear of a man, a glass part (20) supported by the frame (10) to cover a vision of a left eye and a vision of a right eye of the user, and a camera (30) mounted at one side of the frame to photograph a surrounding environment.

The frame (10) and the glass part (20) are not limited in terms of shape or material and may be variably applied. However, the frame (10) and the glass part (20) may be formed therein with a space in order to accommodate various elements (described later) of the device (1). Furthermore, the glass part (20) may be formed with a transparent material to enable a projection of a light. Now, a detailed configuration of the head mounted display device (1) will be described with reference to FIG. 2.

Figure 2:
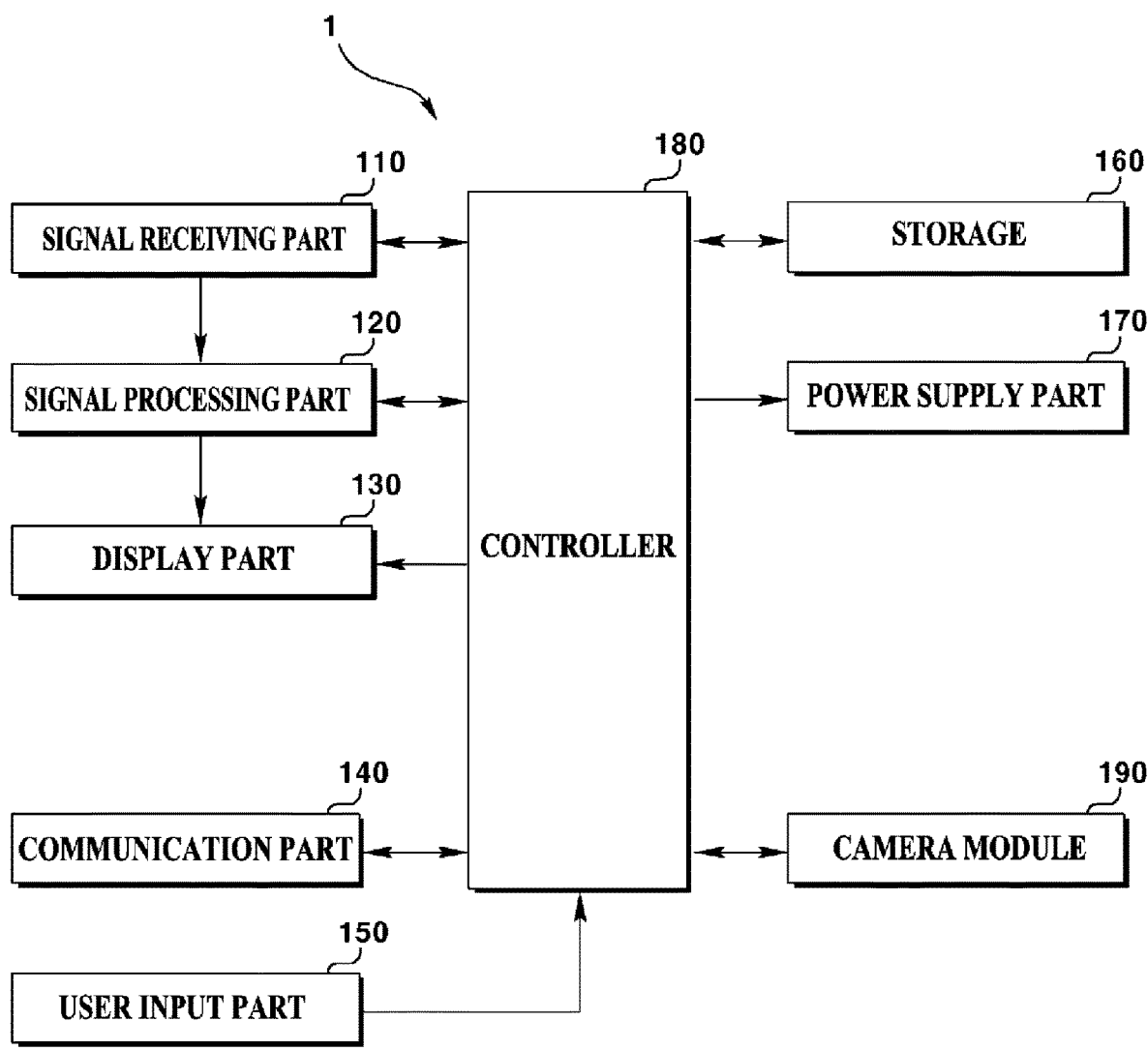
FIG. 2 is a block diagram illustrating a head mounted display device of FIG. 1.

FIG. 2 is a block diagram illustrating a head mounted display device of FIG. 1. Each element of the display device (1) illustrated in the drawing may be accommodated into the frame (10) of FIG. 1 or the glass part (20), and the shape or method accommodated by the elements may be variable in response to the shape of the frame (10) and the glass part (30), and do not limit the idea of the present invention.

Furthermore, the elements illustrated in the drawing are simply one of examples of the display device (1), and therefore, it does not mean that elements not illustrated or not described in the display device (10) realized with the idea of the present invention are unnecessary elements, or the display device (1) includes only the elements illustrated in the drawings.

Referring to FIG. 2, the head mounted display device (1) may include a signal receiving part (110) receiving an image signal from outside, a signal processing part (120) processing the image signal received from the signal receiving part (110) in response to a pre-set image processing process, a display part (130) displaying, as an image, the image signal processed by the signal processing part (120), a communication part (140) communicating with various external devices (not shown), a user input part (150) generating a control command pre-set by a user manipulation, storage (160) storing data, a power supply part (170) supplying an operation power to each element of the head mounted display device (1), a controller (180) controlling an entire operation of the head mounted display device (1) and a camera (190) photographing a video or a still image relative to an external environment. The head mounted display device (1) may further include a microphone or an earphone detecting or outputting a sound.

The signal receiving part (110) may transmit, to the signal processing part (120) or to the controller (180), an image signal by receiving the image signal transmitted from outside via wireless or wired method. For example, the signal receiving part (110) can receive via a wireless method an RF (Radio Frequency) signal transmitted from a broadcasting station (not shown), or can receive, via a wired method, an image signal according to a composite video, component video, a supervideo, SCART, HDMI (High Definition Multimedia Interface), displaydport, UDI (Unified Display Interface) or wireless HD standard.

Although the signal receiving part (110) in the exemplary embodiment of the present invention is expressed as an element separate from the communication part (140), the signal receiving part (110) and the communication part (140) may be integrated into a communication interface depending on design methods.

The signal processing part (120) may perform various image processing works relative to an image signal received from the signal receiving part (110). An image based on a relevant image signal may be displayed on the display part (130) by allowing the signal processing part (120) to output the image signal performed with the image processing works to the display part (130). The types of image processing works performed by the signal processing part (120) are not limited, and may include, for example, decoding corresponding to image format of image data, de-interfacing converting an image data of interlace method to that of progressive method, scaling adjusting an image data to a pre-set resolution, noise reduction for improvement of image quality, detail enhancement, and frame refresh rate conversion.

The signal processing part (120) may be such that the SOC (System-On-Chip) that has integrated these functions or individual configurations that can independently perform the each process are mounted on a PCB (Printed Circuit Board) to be realized via an image processing board (not shown) and to be embedded in the display part (130).

The display part (130) may allow an image signal processed by the signal processing part (120) to be captured and displayed as an image near to both eyes of a user. A detailed configuration for the display part (130) to display an image will be explained later.

The communication part (140) may perform bi-directional communication with various types of outside devices (not shown) through wireless/wired communication methods. The communication part (140) may form a communication interface along with the signal receiving part (120) depending on design methods. The communication part (140) according to an exemplary embodiment of the present invention may perform a wireless communication according to bi-directional RF (Radio Frequency) communication standard such as RF (Radio Frequency) and Bluetooth.

The user input part (150) may generate a control command pre-set by a user manipulation and transmit the control command to the controller (180). For example, the user input part (150) may be realized by an input key pad (not shown) mounted at a frame (10. see FIG. 1), a glass (20, see FIG. 1) mounted on a touch screen (not shown) or a touch sensor (not shown). Alternatively, the user input part (150) may be configured by a remote controller independently separated from the display device (1) or an outside device (not shown) such as a mobile phone. In this case, the user input part (150) may communicate with the communication part (140) to transmit a control command to the controller (180).

The storage (160) may be stored with unlimited data in response to a control by the controller. The storage (160) may be configured by nonvolatile memories such as a flash-memory and a hard-disc drive. The storage (160) may be accessed by the controller (180) and may perform such works as reading/recording/deletion/renewal of data by the controller (180). The power supply part (170) may provide an operation power to each element of the head mounted display device (1) to allow performing an entire element of the device (10).

Although the power supply part (170) may be implemented by a primary cell (battery) or a secondary cell (battery), the power supply part (170) is preferably realized by a secondary cell chargeable by an external power source for usability. The power supply part (170) may be controlled in power supply by the controller (180), and controlled in terms of output of power source to a particular constitutional element, level of output voltage and adjustment of output duty, for example.

The camera (190) may be mounted at an outside of the frame (10, see FIG. 1) to detect or photograph an external environment of the display device (10). The camera (190) may photograph an external environment at a predetermined time to generate a still image or photograph an external environment for a preset period of time to generate a video. The camera (190) may monitor an external environment for a predetermined period of time.

Figure 3:
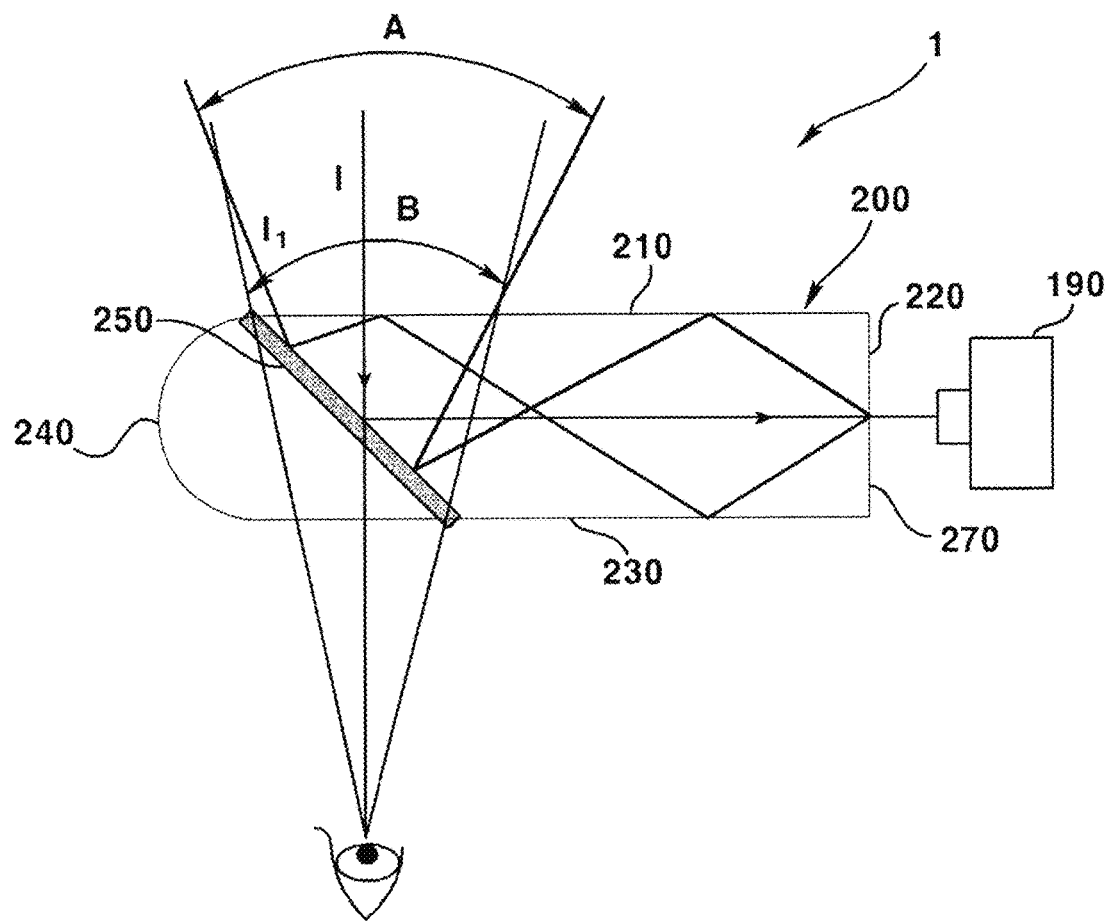
FIG. 3 is a schematic view illustrating formation of an optical path of a head mounted display device (1) according to an exemplary embodiment of the present invention.

FIG. 3 is a schematic view illustrating formation of an optical path of camera module (190) at the head mounted display device (1) according to an exemplary embodiment of the present invention.

Referring to FIG. 3, the head mounted display device (1) may be formed by including a camera module (190) and a prism (200). The camera module (190) is to photograph an image surrounding the display device (1) and may be installed to face the prism (200) in terms of lens direction. Meantime, the camera module (190) may be arranged at a front side with an optical system such as condenser lens (270). The condenser lens may function to collect an incident light by being installed at a front side of a light-advancing direction of a camera module or a display device. The condenser lens may be configured by a combination of lenses selected from a spherical lens or an aspherical lens. Although FIG. 3 illustrates the camera module (190) and the prism (200), each being distanced from the other, the camera module (190) may be formed by allowing the prism (200) to contact the camera module (190) depending on applied circumstances.

The prism (200) is an element for forming an optical path in order to allow an image to be captured on the camera module (190). The prism (200) according to an exemplary embodiment of the present invention may be formed by four optical surfaces (210, 220, 230, 240)), and may be formed therein with a polarization beam splitter (250).

An incident light (I) incident on the prism (200) through the first optical surface (210) may be reflected from the polarization beam splitter (250) to be incident on the camera module (190) by being emitted to the third optical surface (230). At this time, the polarization beam splitter (250) is a reflection-transmission surface that reflects or transmits the incident light in response to a difference of polarization components in the incident light. For example, P wave in the incident light man transmit the polarization beam splitter (250) and the S wave may be reflected from the polarization beam splitter (250) to be incident on the camera module (190). At this time, the incident light is not only incident vertically but also incident slantly as illustrated in the drawing, where the slantly incident light (11, 12) may be reflected from the polarization beam splitter (250) and totally reflected from the first optical surface (210) and the third optical surface (230) inside the prism (200) to be incident on the camera module (190).

The first optical surface (210) and the third optical surface (230) may be arranged in parallel while the first polarization beam splitter may be slantly arranged at a 45° between the first optical surface and the third optical surface. A total reflection may be generated from the first optical surface (210) and the third optical surface (230) when a light is incident over a critical angle according to Snell Rule. The Snell Rule and the total reflection principle are well known to the skilled in the art such that no further detailed explanation thereto will be made herein.

Furthermore, the second optical surface (220) may be formed with a condenser lens (270). That is, as discussed above, although a condenser lens may be formed between the camera module (190) and the second optical surface, the second optical surface (220) may be designed in a shape of a lens.

The light (I) incident within a scope (A) by the above configuration may be reflected from the polarization beam splitter (250) and reflected from the first optical surface (210) and the third optical surface (230) to be incident on the camera module (190). At this time, an incident light (I1) may be totally reflected one time from the first optical surface (210) and again totally reflected from the third optical surface (230), that is, the total reflection is implemented twice. However, an incident light (I2) may be reflected only from the first optical surface (210), that is, the total reflection is implemented once for the incident light (I2). However, the frequency of total reflection is not limited, and may be variably changed depending on length of the prism (200).

The camera module (190) can photograph a surrounding environment existent within the scope (A) according to the optical path. It can be ascertained that the photographed scope (A) of the camera module (190) thus formed as explained above substantially matches a view scope (B) of a user wearing the head mounted display device (1).

As discussed above, when the camera module (190) is rotated to face a direction of the prism (200), a view (B) of an observer seen through the head mounted display device (1) and a photographed scope (A) of the camera module (190) become substantially same.

Figure 4:
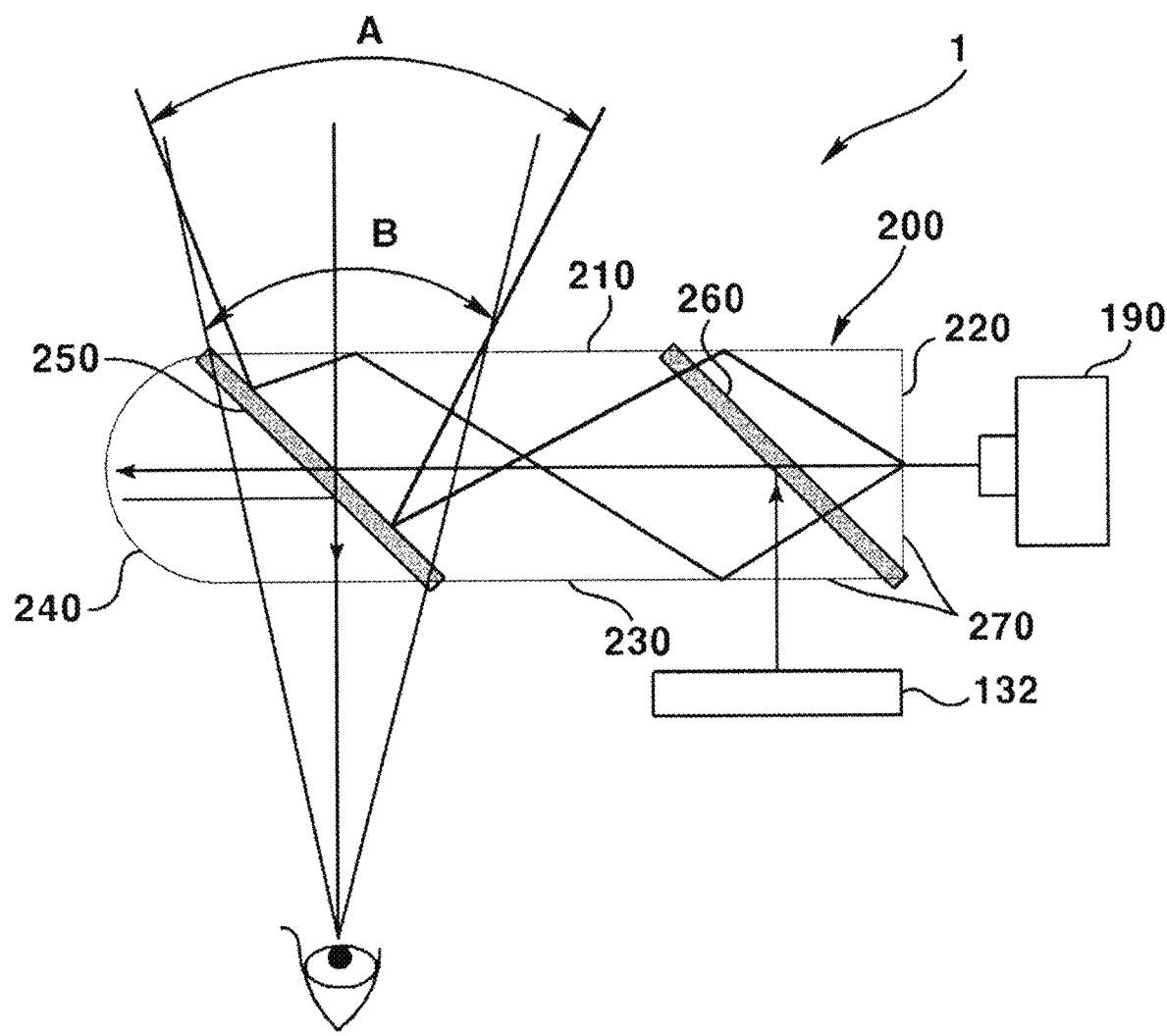
FIG. 4 is a schematic view illustrating formation of an optical path of a head mounted display device (1) according to another exemplary embodiment of the present invention.

FIG. 4 is a schematic view illustrating an addition of a display element to an exemplary embodiment of FIG. 3.

That is, the head mounted display device (1) according to an exemplary embodiment of the present invention may further include a display element (132) in addition to the camera module (190) and the prism (200), and according to the exemplary embodiment, an image photographed by the camera module (190) can be viewed using the display element (132).

The display element (132) is an element (device) displaying an image, and may be used by various display elements such as LCD panel and the like, and an image can be displayed by the signal processing part (120). For example, the display element (132) may be used by a micro reflective LCoS (Liquid Crystal on Silicon), a DLP (Digital Light Processing) element, a micro LCD element coupled with a light source, or a self-emitting micro OLED element, and its size may be preferably less than 1 inch.

Meantime, the micro reflective LCoS, the DLP element and the micro LCD element are not self-illumination elements, such that a light source must be coupled from outside thereto. That is, a reflective micro LCD panel using a transmission type micro LCD panel using a backlight or a front light may be useable. The micro OLED panel is capable of self-illumination, such that no separate light source is required, and therefore, the head mounted display device can be implemented in a smaller configuration when used of the micro OLED panel. At this time, an optical system may be used to adjust an optical path to allow a light emitted from the light source to be incident on the display element (132). Furthermore, the display element (132) may be formed at a front side with a condenser lens (270) as noted above.

The addition of display element (132) may allow forming another polarization beam splitter (260) inside the prism (200) in order to process a light emitted from the display element (132). Hereinafter, the polarization beam splitters (250, 260) are to be called as first polarization beam splitter (250) and second polarization beam splitter (260).

The first polarization beam splitter (250) and the second polarization beam splitter (260) may be installed in parallel, and may be slantly formed at a 45° relative to the first optical surface (210) and the third optical surface (230).

By this configuration, the light emitted from the display element (132) may be incident on the prism (200) and may be incident on eyes of a user through the first polarization beam splitter (250) and the second polarization beam splitter (260).

To be more specific, S polarization is emitted from the display element (132) such that the S polarization is reflected from the second polarization beam splitter (260) to be changed to P polarization. The P polarization transmits the first polarization beam splitter (250) and is reflected from the fourth optical surface (240) to be changed again to S polarization, and reflected from the first polarization beam splitter (250) to be incident on eyes of a user wearing the head mounted display device.

At this time, the fourth optical surface (240) may be a flat surface, but is preferably formed in a concave manner. When the fourth optical surface (240) is concavely formed, an entire length of prism can be made shorter to be conducive to making the display device smaller. Furthermore, the fourth optical surface may be formed with a reflective coating. The optical path incident on the camera module (190) will not be reiterated because of being same as discussed in FIG. 3.

A user of the head mounted display device (1) can not only view an image photographed by the camera module (190), but can also view an image displayed from the display element (132), because of the addition of the display element (132). The image photographed by the camera module (190) may be stored in the storage (160, see FIG. 2), and when a reproduction command is inputted from the user input part (150), a user can view the image through the display element (132).

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

INDUSTRIAL APPLICABILITY

The present invention can be used on various electronic devices used with the head mounted display device. For example, the present invention may be used in various fields such as automobiles, game machines and educational simulation devices.

The invention claimed is:

1. A head mounted display device, the device comprising:
   a prism for changing a path of incident light and then emitting the incident light, the prism having therein a first reflection-transmission surface and a second reflection-transmission surface for reflecting or transmitting the incident light; and
   a camera module of which a lens is disposed in a direction that faces the prism,
   wherein the first reflection-transmission surface is a first polarization beam splitter, and the second reflection-transmission surface is a second polarization beam splitter formed in parallel with the first polarization beam splitter,
   wherein the prism includes a first optical surface, a second optical surface extensively formed from the first optical surface, a third optical surface extensively formed from the second optical surface in parallel with the first optical surface, and a fourth optical surface extensively formed from the third optical surface and facing the second optical surface,
   wherein the first reflection-transmission surface is slantedly formed between the first optical surface and the third optical surface, and
   wherein the camera module is disposed at a side of the second optical surface such that the lens of the camera module faces the second optical surface.

2. The head mounted display device of claim 1, wherein the first polarization beam splitter reflects or projects a light in response to a polarization component.

3. The head mounted display device of claim 2, wherein the first polarization beam splitter is slantedly formed at a 45° between the first optical surface and the third optical surface.

4. The head mounted display device of claim 2, wherein the first polarization beam splitter emits the incident light to the camera module by reflecting the incident light.

5. The head mounted display device of claim 1, comprising, at one side of the prism, a display device displaying an image photographed by the camera module.

6. The head mounted display device of claim 5, wherein the second polarization beam splitter is disposed between the first polarization beam splitter and the camera module.

7. The head mounted display device of claim 6, wherein the second polarization beam splitter reflects a polarization component emitted from the display device.

8. The head mounted display device of claim 7, wherein the fourth optical surface reflects a light reflected from the second polarization beam splitter.

9. The head mounted display device of claim 6, wherein the fourth optical surface is concavely formed.

10. The head mounted display device of claim 6, wherein the fourth optical surface is coated with a reflective coating.

11. The head mounted display device of claim 5, wherein the display device is disposed at a side of the third optical surface.

12. The head mounted display device of claim 11, wherein the third optical surface is formed with a condenser lens.

13. The head mounted display device of claim 11, wherein the display device is disposed such that it faces the second polarization beam splitter.

14. The head mounted display device of claim 1, wherein the fourth optical surface is concavely formed.

15. The head mounted display device of claim 1, wherein the first polarization beam splitter reflects or projects a light in response to a polarization component,
wherein the first polarization beam splitter is slantedly formed at a 45° between the first optical surface and the third optical surface,
wherein the first polarization beam splitter emits the incident light to the camera module by reflecting the incident light,
wherein the head mounted display device comprises, at a side of the third optical surface of the prism, a display device displaying an image photographed by the camera module,
wherein the display device is disposed such that it faces the second polarization beam splitter,
wherein the second polarization beam splitter is disposed between the first polarization beam splitter and the camera module
wherein the second polarization beam splitter reflects a polarization component emitted from the display device,
wherein the fourth optical surface reflects a light reflected from the second polarization beam splitter,
wherein the fourth optical surface is concavely formed, and
wherein the fourth optical surface is coated with a reflective coating.

16. The head mounted display device of claim 15, wherein the second optical surface is formed with a condenser lens.

17. A head mounted display device, the device comprising:
a prism for changing a path of incident light and then emitting the incident light, the prism having therein a reflection-transmission surface for reflecting or transmitting the incident light; and
a camera module of which a lens is disposed in a direction that faces the prism,
wherein the prism comprises a first optical surface, a second optical surface extensively formed from the first optical surface, a third optical surface extensively formed from the second optical surface and formed in parallel with the first optical surface, and a fourth optical surface extensively formed from the third optical surface and facing the second optical surface,
wherein the prism comprises a first reflection-transmission surface slantedly formed between the first optical surface and the third optical surface,
wherein the first reflection-transmission surface is a first polarization beam splitter that reflects or projects a light in response to a polarization component,
wherein the first reflection-transmission surface is slantedly formed between the first optical surface and the third optical surface,
wherein the camera module is disposed at a side of the second optical surface such that the lens of the camera module faces the second optical surface, and
wherein the second optical surface is formed with a condenser lens.

18. The head mounted display device of claim 17, comprising a display device displaying an image photographed by the camera module,
wherein the display device is disposed at a side of the third optical surface of the prism.

19. The head mounted display device of claim 17, wherein the fourth optical surface is concavely formed.

20. The head mounted display device of claim 17, wherein the first polarization beam splitter is slantedly formed at a 45° between the first optical surface and the third optical surface.

* * * * *